G. SCHUSTARICH.
INDICATOR HOLDER.
APPLICATION FILED SEPT. 8, 1919.

1,341,935.

Patented June 1, 1920.

Inventor
George Schustarich,

By

Attorney

UNITED STATES PATENT OFFICE.

GEORGE SCHUSTARICH, OF CICERO, ILLINOIS.

INDICATOR-HOLDER.

1,341,935.  Specification of Letters Patent.  Patented June 1, 1920.

Application filed September 8, 1919. Serial No. 322,596.

*To all whom it may concern:*

Be it known that I, GEORGE SCHUSTARICH, a citizen of the United States, residing at Cicero, in the county of Cook and State of Illinois, have invented certain new and useful Improvements in Indicator-Holders, of which the following is a specification.

This invention relates to holders for indicators, and more particularly to holders for indicators used in setting up or truing work in a lathe drill press or the like.

Indicators are at present provided with holders, the parts of which are connected by clamping screws and which therefore are capable only of one adjustment by which the contact points or fingers of the indicator are brought from near to or in contact with the surface on which the operation of indicating is to be performed. When it is desired to change the position of the indicator no matter how small the change may be, it is necessary to release one of the clamping nuts thereof and adjust the various parts of the indicator holder. In setting up large work this operation may have to be repeated six or seven times and accordingly has a tendency to cause the operator to lose his patience before attaining the desired result and consequently often results in slip-shod work.

In order to avoid so many changes of setting, I have provided a holder for an indicator which after once being roughly set may be more finely adjusted by means of a simple adjusting screw which shifts the indicator any desired degree.

An important object of the invention is the provision of an indicator holder by means of which an indicator having been roughly set may be adjusted to or from the axis of the work or to or from the surface of the work in the general direction of the axis thereof.

Other objects and advantages of the invention will be apparent during the course of the following description.

In the accompanying drawings forming a part of this specification, and in which like numerals are employed to designate like parts throughout the same:

Figure 1:
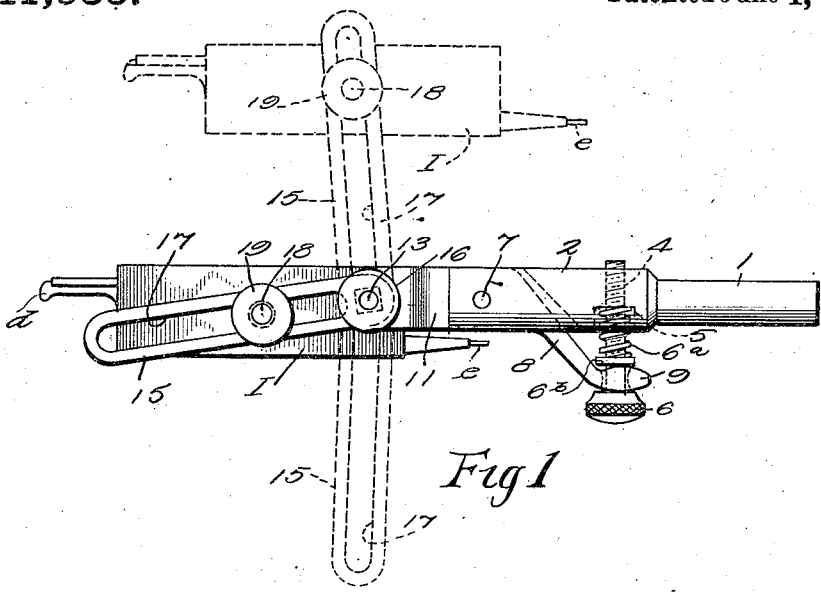
Figure 1 is a plan view of my holder with the indicator attached, the dotted lines thereof indicating various positions to which the arm bearing the indicator may be shifted.
Figure 2:
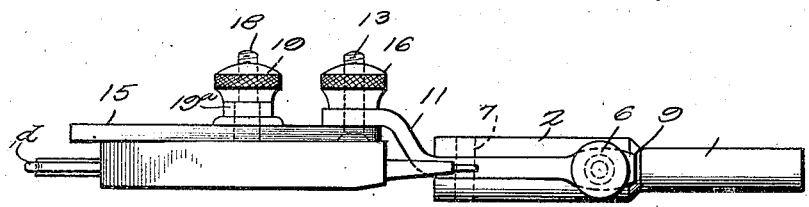
Fig. 2 is a side elevation thereof.

Referring now more particularly to the drawings, the numeral 1 indicates a shank adapted to be chucked in the rotatable spindle of the machine in which the work is being set up.

This shank has an enlarged portion 2 bifurcated at one end to form arms 3 having openings 3ª formed therein for a purpose hereinafter to appear. The enlarged portion of the shank is provided adjacent the chucking portion thereof with a screw threaded opening 4 having on one side thereof a counter-bore 5. Mounted in this screw threaded opening is an adjusting screw 6 having a washer 6ᵇ thereon. Surrounding the screw and seated in the counter-bore is a compression spring 6ª which acts against the washer 6ᵇ for a purpose hereinafter to appear.

Mounted in the openings 3ª is a balance pin 7. Mounted upon the pin 7 intermediate the arms 3 is a bell crank lever 8, one arm of which is provided with a slightly angular extension 9 having an opening 10 formed therein. This angular extension is curved upon its faces, as clearly shown in Fig. 1, and the screw 6 extends through the opening 10 thereof. By virtue of the spring 6ª and washer 6ᵇ this extension is held in constant engagement with the head of the adjusting screw 6. The other arm of the bell crank is provided with an offset 11 and has in the end thereof an opening 12.

Figure 3:
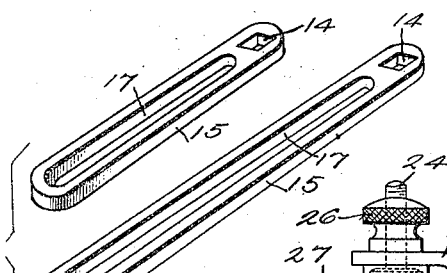
Fig. 3 is a perspective of the arm to which the indicator is attached.

Secured to this end of the bell crank by means of a screw 13 having a square shoulder engaging in a similar opening 14 is the indicating attaching link 15, the clamping screw 13 being provided with a knurled thumb nut 16. As indicated at Fig. 3 the links 15 are supplied in varying lengths. The indicating attaching arm has formed therein an elongated slot 17 in which is slidably mounted a clamping screw 18 provided with a nut 19 which clamping screw is formed upon the indicator and serves to secure the indicator to the arm. The washer 19ª serves to fill the space formed by the difference between the thickness of the swinging arms 15, which in actual practice are only ⅛" thick, and size of the holder furnished by the manufacturer of the indicator, which is usually designed to be put in the tool post of a lathe.

Figure 6:
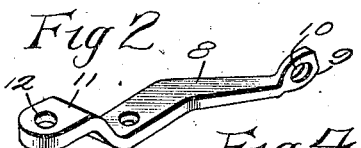
Fig. 6 is a side elevation showing a slightly modified form of clamp for attaching an indicator having a round shank.
Figures 4, 5:
Fig. 4 is a perspective of the balance lever.
Fig. 5 is a perspective of the shank of the holder.
Figure 7:
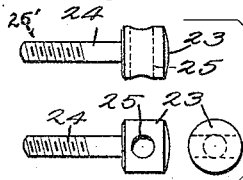
Figs. 7 and 8 are detail views thereof.
Figure 8:
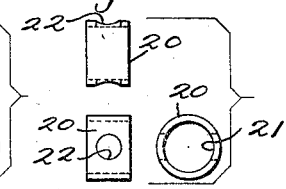

It is to be understood that as some forms of indicators are not provided with means whereby they may be attached to the type of arm shown, it may be desirable to change the construction of this arm: In Figs. 6, 7 and 8 I have shown an attaching screw for use with indicators having cylindrical shanks. This screw may be attached directly to the bell crank of balance lever 8 as shown or to the link 15. This screw comprises a grip collar 20 having a central bore 21 and alined openings 22 formed in the side walls thereof. The bore 21 of the collar is adapted to receive the head 23 of a clamping screw 24 which head is provided with a transverse opening 25 formed therein. The screw 24 is provided with threads 25' to receive the milled nut 26. The openings 22 of the collar and 25 of the screw receive the shank 27 of the indicator and as the nut 26 is tightened a binding action sets in upon the shank 27. It will be obvious that attachments may readily be used with my holder that will receive any type of shank and I do not accordingly limit myself to the constructions here shown.

In operation where it is desired to use the indicator for example to indicate an interior surface of a small hole previously drilled which is to be counter-bored, the shaft of the indicator holder is placed in the chuck of the machine upon which the counterboring operation is to be performed. The arm 15 bearing the indicator I is swung to the left, as shown in Fig. 1, and the indicator secured thereto with the contact point d thereof facing the work and the arm adjusted so that the point d just engages the face plate or table on which the work is to be done. If it is found that the table is in error beyond the limit of the indicator, the indicator may be shifted to or from the table by means of the adjusting screw 6.

By placing the holder bearing the indicator in the headstock of a lathe it is possible to perfectly aline the centers of the lathe, an operation difficult to perform using the forms of indicators now on the market.

To those familiar with the art it will be obvious that by shifting the indicator to various positions and applying the principles above, it may be used in all classes of work in which this type of indicator is necessary.

As many changes are possible in the shape, size and arrangement of parts without departing from the spirit of the invention I do not limit myself to the forms herein shown and described but may make any such changes without in any manner departing from the spirit of the invention or the scope of the subjoined claims.

To those familiar with the art it will be obvious that by shifting the indicator to various positions and applying the principles above, it may be used in all classes of work in which this type of indicator is necessary.

Having thus described my invention, I claim:

1. A holder for indicators, comprising a shank having one end adapted for insertion in a chuck, a bell crank lever pivoted to said shank, a link adjustably secured to one arm thereof, means for securing an indicator to said link, means connecting the other arm of said bell crank and said shank for adjusting said first-named arm and said link.

2. A holder for indicators, comprising a shank having one end adapted for insertion in a chuck and the opposite end bifurcated to form spaced arms, a bell crank lever pivoted intermediate said arms to said shank, a link adjustably secured to one arm thereof, means for securing said link at any desired angle to said arm of the bell crank, means for securing an indicator to said link, and means connecting the other arm of said bell crank and said shank for adjusting the first-named arm of the bell crank and said link.

3. A holder for indicators, comprising a shank having one end adapted for insertion in a chuck, a bell crank lever pivoted to said shank, a link adjustably secured to one arm thereof, means for securing said link at any desired angle to said arm, an elongated slot formed in said link, means slidably mounted within said slot for securing an indicator thereto, and means connecting the other arm of said bell crank and said shank for adjusting said first named arm and said link.

4. A holder for indicators comprising a shank having one end adapted for insertion in a chuck, a bell crank lever pivoted to said shank, a link adjustably secured to one arm thereof, means for securing said link at any desired angle to said arm, means for securing an indicator to said link, and means connecting the other arm of said bell crank and said shank for adjusting said first-named arm and said link, comprising a screw having threaded engagement with said shank, and means connecting said screw and said second-named arm.

In testimony whereof I affix my signature in presence of two witnesses.

GEORGE SCHUSTARICH.

Witnesses:
FRANK A. SCHONTA,
ROBT. J. OLSEM.